(12) United States Patent
Kang

(10) Patent No.: US 9,875,179 B2
(45) Date of Patent: Jan. 23, 2018

(54) SEMICONDUCTOR DEVICE AND OPERATING METHOD THEREOF

(71) Applicant: SK hynix Inc., Gyeonggi-do (KR)

(72) Inventor: Tai Kyu Kang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 35 days.

(21) Appl. No.: 14/864,307

(22) Filed: Sep. 24, 2015

(65) Prior Publication Data

US 2016/0342332 A1 Nov. 24, 2016

(30) Foreign Application Priority Data

May 19, 2015 (KR) ........................ 10-2015-0069620

(51) Int. Cl.
*G06F 12/00* (2006.01)
*G06F 12/02* (2006.01)

(52) U.S. Cl.
CPC .. *G06F 12/0238* (2013.01); *G06F 2212/7204* (2013.01); *G06F 2212/7208* (2013.01); *G06F 2212/7211* (2013.01)

(58) Field of Classification Search
CPC ...... G06F 3/0604; G06F 3/0619; G06F 3/064; G06F 3/0679
See application file for complete search history.

(56) References Cited

U.S. PATENT DOCUMENTS

2013/0346671 A1* 12/2013 Michael .............. G06F 12/0246
711/103
2015/0036434 A1* 2/2015 Hara ...................... G11C 16/26
365/185.17

FOREIGN PATENT DOCUMENTS

KR 1020120098068 9/2012
KR 1020120132820 12/2012
KR 1020140142035 12/2014

* cited by examiner

*Primary Examiner* — Yong Choe
(74) *Attorney, Agent, or Firm* — IP & T Group LLP

(57) ABSTRACT

The semiconductor memory device includes: a memory unit including a plurality of memory blocks; a decoder suitable for storing bad block information about the plurality of memory blocks, and outputting the bad block information in response to an address signal; and a control logic suitable for controlling the memory unit and the decoder to update a status register (SR) code in response to the bad block information when the semiconductor memory device at a ready state enters a busy state, and to perform a general operation according to the updated SR code and a command.

18 Claims, 6 Drawing Sheets

SEMICONDUCTOR DEVICE AND OPERATING METHOD THEREOF

CROSS-REFERENCE TO RELATED APPLICATION

The present application claims priority to Korean patent Application application number 10-2015-0069620, filed on May 19, 2015, in the Korean Intellectual Property Office, the entire disclosure of which is herein incorporated by reference in its entirety.

BACKGROUND

1. Field

The present disclosure relates to an electronic device, and more particularly, to a semiconductor memory device and an operating method thereof.

2. Discussion of Related Art

Semiconductor memory devices are generally classified into volatile memory devices and nonvolatile memory devices.

Nonvolatile memory devices have relatively low write and read rates, but are able maintain stored data without a constant source of power. Accordingly, nonvolatile memory devices are used to store data for situations there is not a constant power source. Nonvolatile memory devices include Read Only Memory (ROM), Mask ROM (MROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), Ferroelectric RAM (FRAM), and the like. Flash memory is generally divided between NOR and NAND types.

Flash memory has the advantages of RAM in that it can be freely programmed and erased, and the advantages of ROM in that it can store data without a constant source of power. Flash memory is widely used as a storage medium in portable electronic devices, such as digital cameras, Personal Digital Assistants (PDA), and MP3 players.

SUMMARY

The present disclosure provides a semiconductor memory device capable of updating a status register (SR) code according to bad block information during an initial operation of the semiconductor device, and an operating method thereof.

An exemplary embodiment of the present disclosure provides a semiconductor memory device, including: a memory unit including a plurality of memory blocks; a decoder suitable for storing bad block information about the plurality of memory blocks, and outputting the bad block information in response to an address signal; and a control logic suitable for controlling the memory unit and the decoder to update a status register (SR) code in response to the bad block information when the semiconductor memory device at a ready state enters a busy state, and to perform a general operation according to the updated SR code and a command.

Another exemplary embodiment of the present disclosure provides a semiconductor memory device, including: a memory unit including first and second planes, each of which includes a plurality of memory blocks; first and second decoders respectively corresponding to the first plane and the second plane, and suitable for outputting first and second bad block information about the first and second planes in response to an address signal; and a control logic suitable for controlling the memory unit and the first and second decoders to update a status register (SR) code in response to the bad block information, and to perform a general operation according to the updated SR code and a command.

Still another exemplary embodiment of the present disclosure provides a method of operating a semiconductor memory device, including: activating a decoder to output bad block information stored therein in response to a command; generating and updating a status register (SR) code in response to the bad block information and an update signal; and performing a general operation according to the updated SR code and the command.

According to the exemplary embodiment of the present disclosure, it is possible to improve reliability and speed of an SR code updating operation by inputting a bad block signal stored in the decoder circuit into the Command Interface circuit during an initial operation of the semiconductor memory device and updating the generated SR code, and then performing a general operation according to a stored algorithm by inputting the updated SR code into a micro block.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present disclosure will become more apparent to those of ordinary skill in the art by describing in detail embodiments thereof with reference to the attached drawings in which.

DETAILED DESCRIPTION

Various advantages and features of the present disclosure and methods of accomplishing such advantages and features will become apparent by reading the following description of embodiments with reference to the accompanying drawings. However, the present disclosure is not limited to the exemplary embodiments described herein, and may be embodied in other forms. However, the present exemplary embodiments are provided for describing the present disclosure in detail so that those skilled in the art may execute the technical spirit of the present disclosure.

Throughout this specification and the claims that follow, when it is described that an element is "coupled" to another element, the element may be "directly coupled" to the other element or "electrically coupled" to the other element through a third element. Throughout the specification and the claims, unless explicitly described to the contrary, the word "comprise" and variations such as "comprises" or "comprising" will be understood to imply the inclusion of stated elements but not the exclusion of any other elements.

Figure 1:
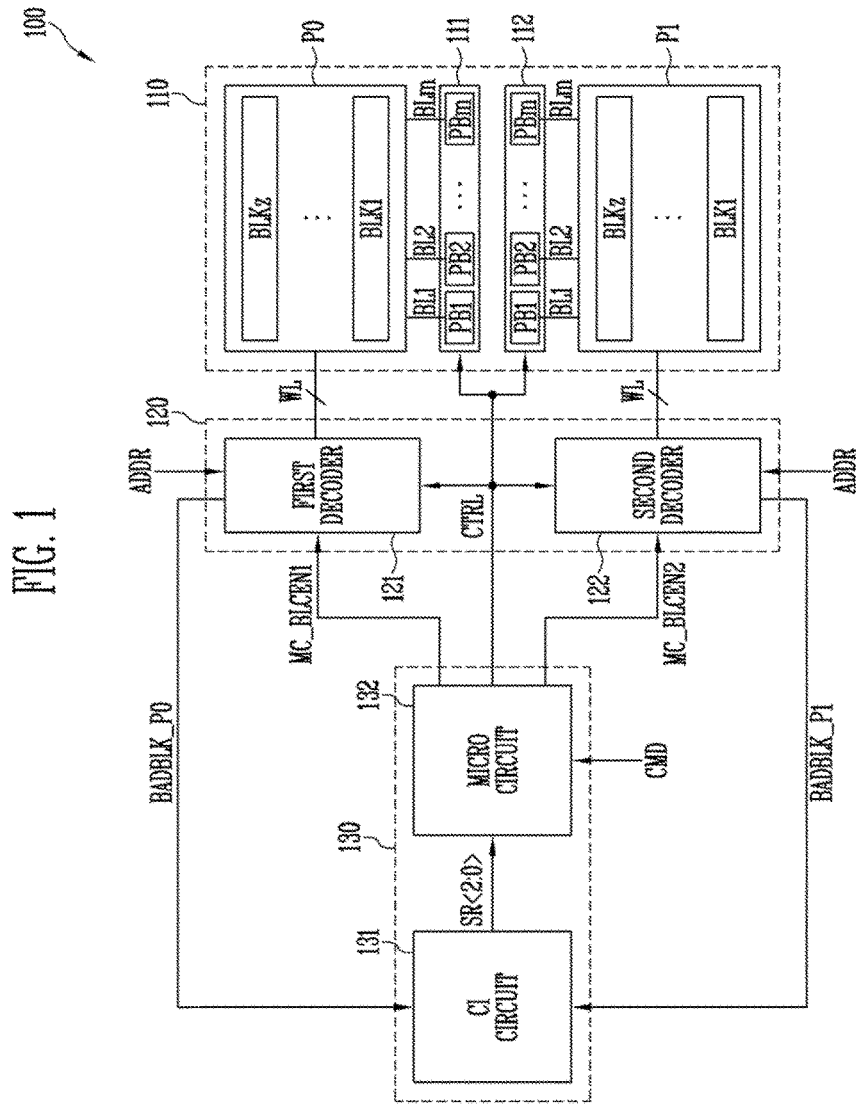
FIG. 1 is a block diagram illustrating a semiconductor memory device according to an exemplary embodiment of the present disclosure.

FIG. 1 is a block diagram illustrating a semiconductor memory device according to an exemplary embodiment of the present disclosure.

Referring to FIG. 1, a semiconductor memory device 100 includes a memory unit 110, a decoder circuit 120, and a control logic 130.

The memory unit 110 includes first and second planes P0 and P1, and first and second read and write circuits 111 and 112 corresponding to the first and second planes P0 and P1, respectively.

Each of the first and second planes P0 and P1 includes a plurality of memory blocks BLK1 to BLKz. The plurality of memory blocks BLK1 to BLKz is connected to the decoder circuit 120 through word lines WL. The plurality of memory blocks BLK1 to BLKz is connected to the first or second read and write circuit 111 or 112 through bit lines BL1 to BLm. Each of the plurality of memory blocks BLK1 to BLKz includes a plurality of memory cells. As an exemplary embodiment, the plurality of memory cells are non-volatile memory cells, and in the plurality of memory cells, the memory cells connected to the same word line are defined as one page. That is, each of the plurality of memory blocks BLK1 to BLKz is formed of a plurality of pages. Further, each of the plurality of memory strings BLK1 to BLKz includes a plurality of strings. Each of the plurality of strings includes a drain selection transistor, memory cells, and a source selection transistor which are serially connected between the bit line and a source line.

The decoder circuit 120 includes a first decoder 121 and a second decoder 122.

The first decoder 121 may be activated in response to a first enable signal MC_BLCEN1, and select one or more memory blocks among the plurality of memory blocks BLK1 to BLKz included in the first plane P0 in response to an address signal ADDR. Further, the first decoder 121 outputs a bad block signal BADBLK_P0 to the control logic 130 in response to the first enable signal MC_BLCEN1 during an initial operation of the semiconductor memory device. The bad block signal BADBLK_P0 may be stored in the first decoder 121, and may represent bad block information of the plurality of memory blocks BLK1 to BLKz included in the first plane P0. The initial operation is defined as an operation for a predetermined time section after turning to a busy state due to an input of an operation command at a ready state of the semiconductor memory device, in which a power supply is turned on.

The second decoder 122 may be activated in response to a second enable signal MC_BLCEN2, and select one or more memory blocks among the plurality of memory blocks BLK1 to BLKz included in the second plane P1 in response to the address signal ADDR. Further, the second decoder 122 outputs a bad block signal BADBLK_P1 to the control logic 130 in response to the second enable signal MC_BLCEN2 during the initial operation of the semiconductor memory device. The bad block signal BADBLK_P1 may be stored in the second decoder 122, and may represent bad block information of the plurality of memory blocks BLK1 to BLKz included in the second plane P1.

The control logic 130 includes a Command Interface circuit (CI circuit) 131 and a micro circuit 132.

The CI circuit 131 initializes and outputs an SR code SR<2:0> when the semiconductor memory device enters the busy state after the ready state, and then updates and outputs the SR code SR<2:0> in response to the bad block signals BADBLK_P0 and BADBLK_P1 provided from the decoder circuit 120 during the initial operation.

When a command CMD is input, the micro circuit 132 outputs the first and second enable signals MC_BLCEN1 and MC_BLCEN2 in order to control the first and second decoders 121 and 122 to output the bad block information stored in the first and second decoders 121 and 122 as the bad block signals BADBLK_P0 and BADBLK_P1.

The micro circuit 132 outputs a control signal CTRL for performing a general operation of the semiconductor memory device by controlling the decoder circuit 120 and the first and second read and write circuits 111 and 112 according to the SR code SR<2:0> provided from the CI circuit 131 and the command CMD.

Figure 2:
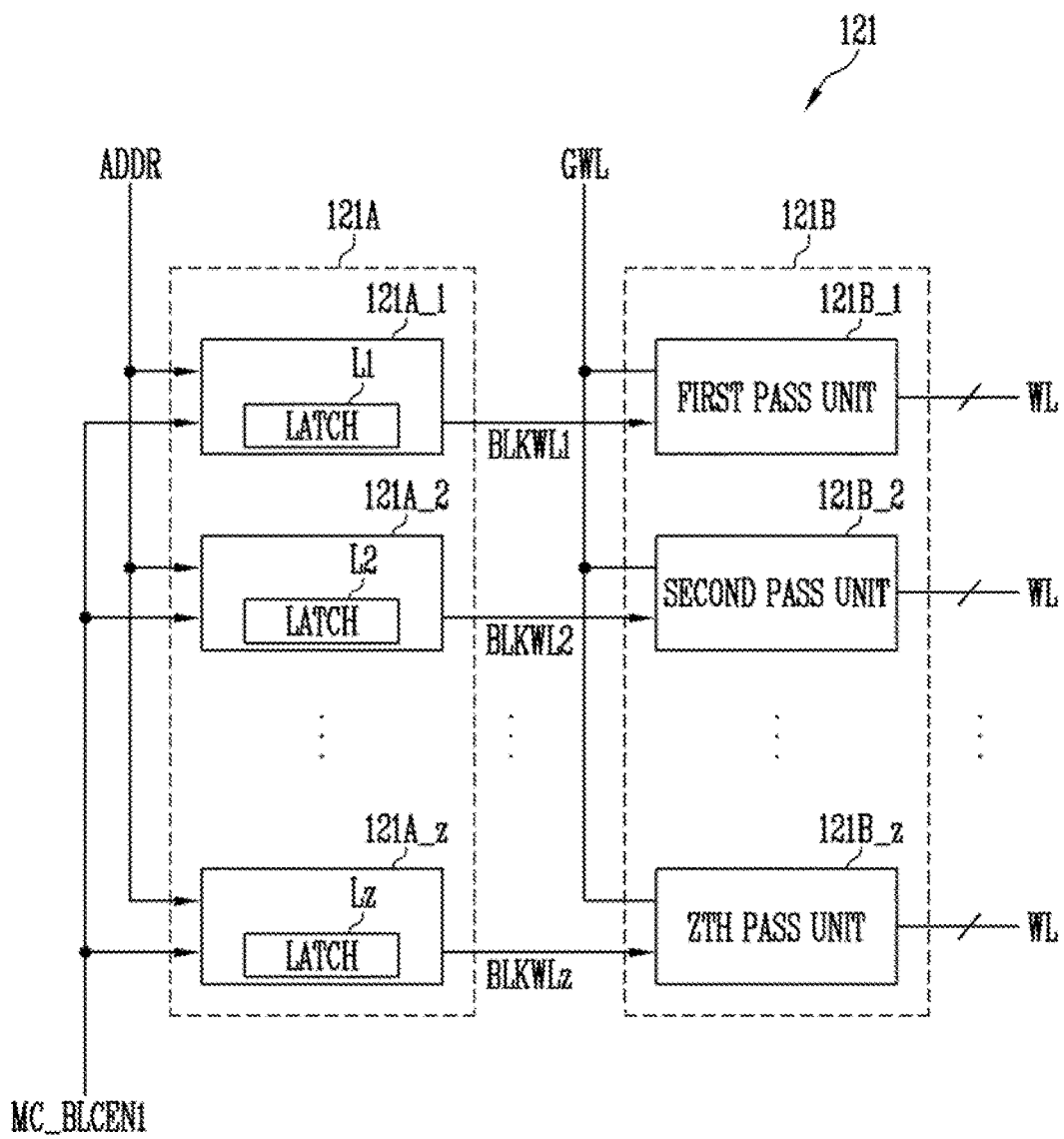
FIG. 2 is a block diagram illustrating a first decoder of FIG. 1.

FIG. 2 is a block diagram illustrating the first decoder 121 described with reference with FIG. 1.

The first decoder 121 and the second decoder 122 included in the decoder circuit 120 of FIG. 1 have similar configurations and connection relationships, so that the present disclosure will be described based on the first decoder 121 as an example.

Referring to FIG. 2, the first decoder 121 includes a block selection section 121A and a pass section 121B.

The block selection section 121A includes a plurality of block selection units 121A_1 to 121A_z. Each of the plurality of block selection units 121A_1 to 121A_z is activated in response to the first enable signal MC_BLCEN1, and outputs one of block selection signals BLKWL1 to BLKWLz when an input address signal ADDR corresponds to an address of a corresponding memory block. Further, the plurality of block selection units 121A_1 to 121A_z includes latches L1 to Lz storing bad block information of the corresponding memory blocks, respectively. The latches L1 to Lz output the bad block information of the memory blocks included in the first plane P0 as the bad block signal BADBLK_P0 in response to the first enable signal MC_BLCEN1 during the initial operation of the semiconductor memory device.

The pass section 121B includes a plurality of pass units 121B_1 to 121B_z. The plurality of pass units 121B_1 to 121B_z is connected with global word lines GWL, and connects the word lines WL of the selected memory blocks among the plurality of memory blocks with the global word lines GWL and provides operation voltages applied to the global word lines GWL to the word lines WL of the selected memory blocks in response to the block selection signals BLKWL1 to BLKWLz output from the block selection section 121A.

Figure 3:
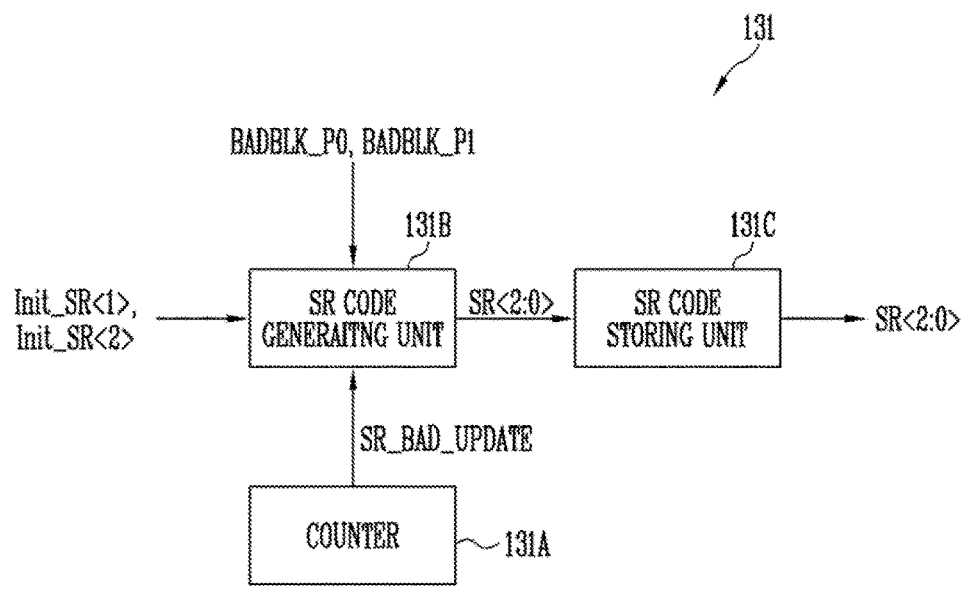
FIG. 3 is a block diagram illustrating a CI circuit of FIG. 1.

FIG. 3 is a block diagram for describing the CI circuit 131 described with reference to FIG. 1.

Referring to FIG. 3, the CI circuit 131 includes a counter 131A, an SR code generating unit 131B, and an SR code storing unit 131C.

The counter 131A outputs an SR code update signal SR_BAD_UPDATE during the initial operation, and outputs the SR code update signal SR_BAD_UPDATE, which is delayed by a predetermined time. The time from the activation of the decoder 120 to the output of the bad block signals BACBLK_P0 and BADBLK_P1 for the first and second planes P0 and P1 to the control logic 130 is reflected in the predetermined time for the delay of the SR code update signal SR_BAD_UPDATE.

The SR code generating unit 131B initializes and outputs the SR code SR<2:0> in response to initialization signals Init_SR<1> and Init_SR<2>, which are input at the ready state. The SR code generating unit 131B outputs a new SR code SR<2:0> in response to the SR code update signal SR_BAD_UPDATE and the bad block signals BADBLK_P0 and BADBLK_P1, which are provided during the initial operation.

The SR code storing unit 131C updates the SR code SR<2:0>, which is stored therein, through the SR code SR<2:0> provided from the SR code generating unit 131B. When an operation command is input into the semiconductor memory device, the SR code storing unit 131C outputs the updated SR code SR<2:0> to the micro circuit 132.

Figure 4:
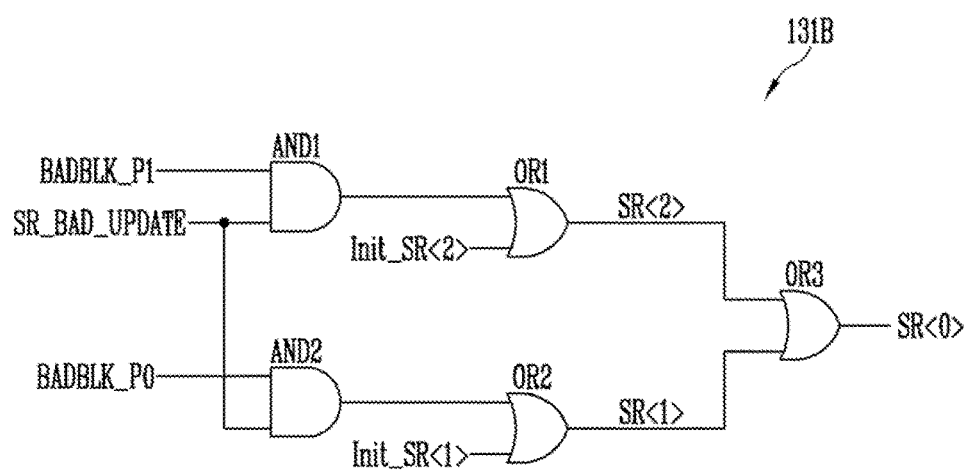
FIG. 4 is a circuit diagram illustrating an SR code generating unit of FIG. 3.

FIG. 4 is a circuit diagram for describing the SR code generating unit 131B described with reference to FIG. 3.

Referring to FIG. 4, the SR code generating unit 131B includes first and second AND gates AND1 and AD2 and first to third OR gates OR1, OR2, and OR3.

The first AND gate AND1 outputs a logic signal in response to the bad block signal BADBLK_P1 of the second plane and the SR code update signal SR_BAD_UPDATE. The first OR gate OR1 outputs an SR code signal SR<2> in response to the logic signal output from the first AND gate AND1 and the initialization signal Init_SR<2>.

The second AND gate AND2 outputs a logic signal in response to the bad block signal BADBLK_P0 of the first plane and the SR code update signal SR_BAD_UPDATE. The second OR gate OR2 outputs an SR code signal SR<1> in response to the logic signal output from the second AND gate AND2 and the initialization signal Init_SR<1>.

The third OR gate OR3 outputs an SR code signal SR<0> in response to the SR code signal SR<2> and the SR code signal SR<1>.

Figure 5:
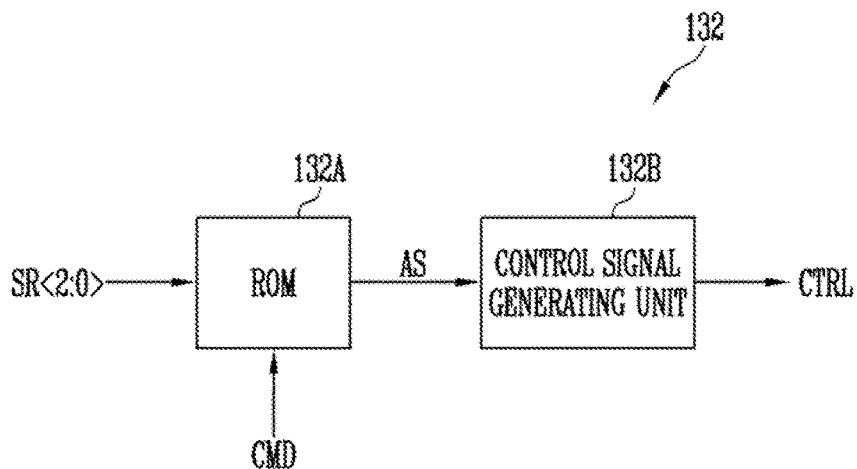
FIG. 5 is a block diagram illustrating a micro circuit of FIG. 1.

FIG. 5 is a block diagram for describing the micro circuit 131C described with reference to FIG. 1.

Referring to FIG. 5, the micro circuit 132 includes a ROM 132A and a control signal generating unit 132B.

The ROM 132A stores an algorithm for general operation of the semiconductor memory device, and outputs an algorithm signal AS in response to the SR code SR<2:0> and the command CMD input during the operation of the semiconductor memory device.

The control signal generating unit 132B outputs a control signal CTRL for performing the general operation of the semiconductor memory device by controlling the decoder circuit 120 and the first and second read and write circuits 111 and 112 in response to the algorithm signal AS output from the ROM 132A.

Figure 6:
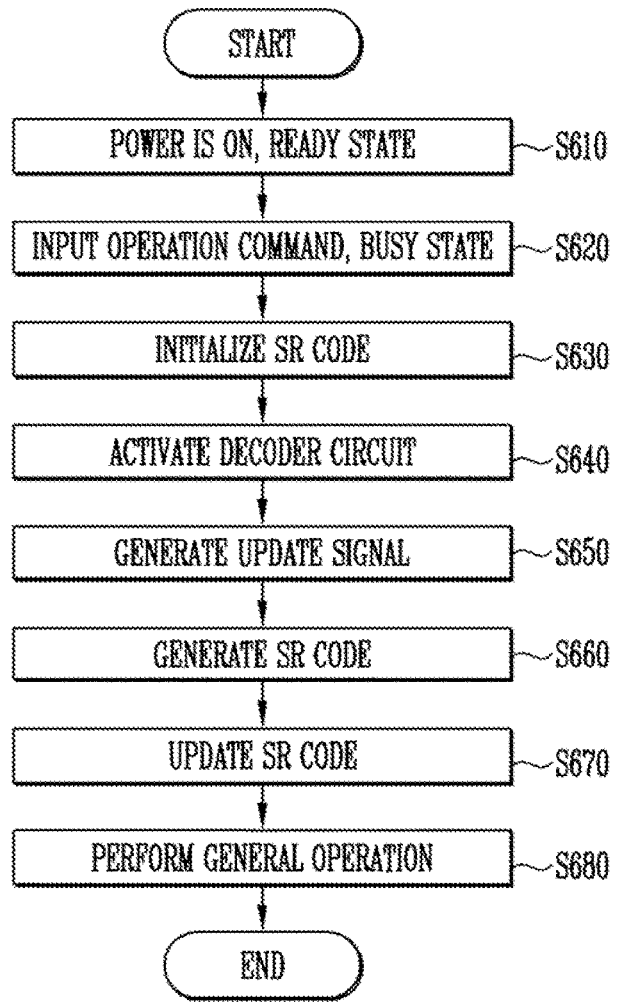
FIG. 6 is a flowchart illustrating an operating method of the semiconductor memory device according to an exemplary embodiment of the present disclosure.

FIG. 6 is a flowchart illustrating an operating method of the semiconductor memory device according to an exemplary embodiment of the present disclosure.

The operating method will be described below with reference to FIGS. 1 to 6.

1) Power on and Ready State (S610)

When a power voltage is input into the semiconductor memory device 100, the power of the semiconductor memory device 100 is turned on, so that the semiconductor memory device 100 enters a ready state.

2) Operation Command Input and Busy State (S620)

When a command CMD for performing a general operation of the semiconductor memory device is input from the inside or outside of the semiconductor device, the semiconductor memory device enters the busy state after the ready state.

3) Initialization of SR Code (S630)

The SR code generating unit 131B of the CI circuit 131 initializes and outputs an SR code SR<2:0> in response to initialization signals Init_SR<1> and Init_SR<2> when the semiconductor memory device enters the busy state after the ready state, and the SR code storing unit 131C stores the initialized SR code SR<2:0>. In this case, the initialization state of the SR code SR<2:0> may be a pass state PASS.

4) Activation of Decoder Unit (S640)

The micro circuit 132 controls the first and second decoder 121 and 122 to output the bad block information stored in the first and second decoders 121 and 122 as bad block signals BADBLK_P0 and BADBLK_P1 by providing first and second enable signals MC_BLCEN1 and MC_BLCEN2 to the first and second decoder 121 and 122.

The first and second decoder units 121 and 122 are activated in response to the first and second enable signals MC_BLCEN1 and MC_BLCEN2 of the micro circuit 132, and output the bad block information of a memory block corresponding to an input address signal ADDR as the bad block signals BADBLK_P0 and BADBLK_P1.

5) Generation of Update Signal (S650)

The counter 131A of the CI circuit 131 outputs the SR code update signal SR_BAD_UPDATE, which is delayed by the predetermined time, to which a time from the activation of the decoder 120 to the output of the bad block signals BACBLK_P0 and BADBLK_P1 is reflected.

6) Generation of SR Code (S660)

The SR code generating unit 131B of the CI circuit 131 generates the SR code SR<2:0> in response to the bad block signals BADBLK_P0 and BADBLK_P1 and the SR code update signal SR_BAD_UPDATE during the initial operation.

The bad block information according to the SR code SR<2:0> is represented in a table below.

TABLE 1

| SR code | Page program | Block erase | Coding |
|---|---|---|---|
| SR<0> | Pass/fail | Pass/fail | Pass: 0, Fail: 1 |
| SR<1> | Pass/fail of first plane | Pass/fail of first plane | Pass: 0, Fail: 1 |
| SR<2> | Pass/fail of second plane | Pass/fail of second plane | Pass: 0, Fail: 1 |

As represented in Table 1, the SR code SR<0> represents whether a bad block occurs during a page program operation or a block erase operation of the first and second planes P0 and P1, the SR code SR<1> represents whether a bad block occurs during a page program operation or a block erase operation of the memory block included in the first plane P0, and the SR code SR<2> represents whether a bad block occurs during a page program operation or a block erase operation of the memory block included in the second plane P1.

7) Update of SR Code (S670)

The SR code storing unit 131C of the CI circuit 131 updates the SR code through the SR code SR<2:0> generated at step S660.

8) Operation (S680)

The micro circuit 132 outputs the control signal CTRL for performing a general operation of the semiconductor memory device by controlling the decoder circuit 120 and the first and second read and write circuits 111 and 112 according to the SR code SR<2:0> provided from the CI circuit 131 and the command CMD, thereby controlling the operation of the semiconductor memory device.

According to the exemplary embodiments of the present disclosure, when a command is input in order to perform a general operation, such as program, erase, and read operations, the semiconductor memory device may generate an SR code through the CI circuit to perform an SR code update operation.

Figure 7:
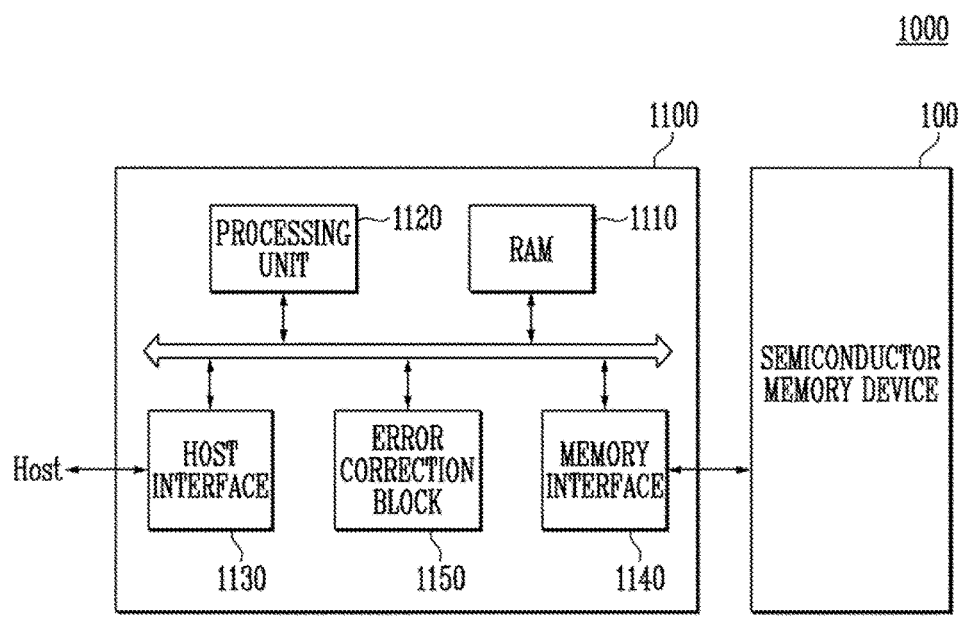
FIG. 7 is a block diagram illustrating a memory system including the semiconductor memory device of FIG. 1.

FIG. 7 is a block diagram Illustrating a memory system including the semiconductor memory device of FIG. 1.

Referring to FIG. 7, a memory system 1000 includes a semiconductor memory device 100 and a controller 1100.

The semiconductor memory device 100 is the same as the semiconductor memory device described with reference to FIG. 1, and overlapping descriptions will be omitted below.

The controller 1100 is connected to a host Host and the semiconductor memory device 100. The controller 1100 is configured to access the semiconductor memory device 100 in response to a request from the host. For example, the controller 1100 is configured to control read, write, erase, and background operations of the semiconductor memory device 100. The controller 1100 is configured to provide an interface between the semiconductor memory device 100 and the host Host. The controller 1100 is configured to drive firmware for controlling the semiconductor memory device 100.

The controller 1100 includes a Random Access Memory (RAM) 1110, a processing unit 1120, a host Interface 1130, a memory interface 1140, and an error correction block 1150. The RAM 1110 is used as at least one among a working memory of the processing unit 1120, a cache memory between the semiconductor memory device 100 and the host Host, and a buffer memory between the semiconductor memory device 100 and the host Host. The processing unit 1120 controls general operations of the controller 1100. Further, the controller 1100 may temporarily store program data provided from the host during a write operation.

The host interface 1130 includes a protocol for performing a data exchange between the host Host and the controller 1100. In an embodiment, the controller 1100 is configured to communicate with the host through at least one of various interface protocols, such as a Universal Serial Bus (USB) protocol, a Multimedia Card (MMC) protocol, a Peripheral Component Interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, and an Integrated Drive Electronics (IDE) protocol, and a private protocol.

The memory interface 1140 interfaces with the semiconductor memory device 100. For example, the memory interface includes a NAND interface or a NOR interface.

The error correction block 1150 is configured to detect and correct an error of the data received from the semiconductor memory device 100 by using an Error Correction Code (ECC). The processing unit 1120 may control the semiconductor memory device 100 to adjust a read voltage according to a result of the error detection of the error correction block 1150 and perform a re-read operation. In an embodiment, the error correction block may be provided as a constituent element of the controller 1100.

The controller 1100 and the semiconductor memory device 100 may be integrated into one semiconductor device. In an embodiment, the controller 1100 and the semiconductor memory device 100 may be integrated into one semiconductor device to configure a memory card. For example, the controller 1100 and the semiconductor memory device 100 may be integrated into one semiconductor device to configure a memory card, such as a PC card (Personal Computer Memory Card International Association (PCM-CIA)), a Compact Flash (CF) card, Smart Media Cards (SM, SMC), a memory stick, multimedia cards (MMC, RS-MMC, and MMCmicro), SD cards (SD, miniSD, microSD, and SDHC), and a Universal Flash Storage (UFS).

The controller 1100 and the semiconductor memory device 100 may be integrated into one semiconductor device to configure a semiconductor drive (Solid State Drive (SSD)). The semiconductor drive (SSD) includes a storage device configured to store data in a semiconductor memory. If the memory system 1000 is used in an SSD, the operation speed of the host connected to the memory system 2000 is remarkably improved.

As another example, the memory system 1000 is provided as one of various constituent elements of an electronic device, such as a computer, an ultra-mobile PC (UMPC, a workstation, a net-book computer, personal digital assistants (PDA), a portable computer, a web tablet PC, a wireless phone, a mobile phone, a smart phone, an e-book reader, a portable multimedia player (PMP), a portable game device, a navigation device, a black box, a digital camera, a 3-dimensional television, a digital audio recorder, a digital audio player, a digital picture recorder, a digital picture player, a digital video recorder, a digital video player, a device capable transceiving information in a wireless environment, one of various electronic devices configuring a home network, one of various electronic devices configuring a computer network, one of various electronic devices configuring a telematics network, an RFID device, or one of various constituent elements devices configuring a computing system.

In an embodiment, the semiconductor memory device 100 or the memory system 1000 may be mounted in various types of packages. For example, the semiconductor memory device 100 or the memory system 2000 may be packaged and mounted by a method such as Package on Package (PoP), Ball Grid Arrays (BGAs), Chip Scale Packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flat pack (TQFP), Small Outline (SOIC), Shrink Small Outline Package (SSOP), Thin Small Outline (TSOP), Thin Quad Flat pack (TQFP), System In Package (SIP), Multi Chip Package (MCP), Wafer-level Fabricated Package (WFP), and Wafer-Level Processed Stack Package (WSP).

Figure 8:
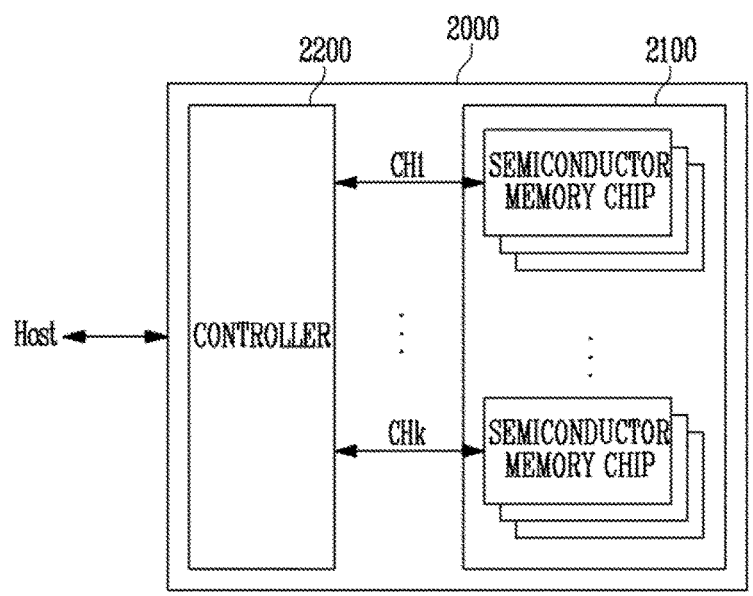
FIG. 8 is a block diagram illustrating an applied example of the memory system of FIG. 7.

FIG. 8 is a block diagram Illustrating an applied example of the memory system of FIG. 7.

Referring to FIG. 8, a memory system 2000 includes a semiconductor memory device 2100 and a controller 2200. The semiconductor memory device 2100 includes a plurality of semiconductor memory chips. The plurality of semiconductor memory chips is divided into a plurality of groups.

In FIG. 8, it is Illustrated that the plurality of groups communicates with the controller 2200 through first to $k^{th}$ channels CH1 to CHk, respectively. Each semiconductor memory chip may be configured and operated in a similar manner to one in the semiconductor memory device 100 described with reference to FIG. 1.

Each group is configured to communicate with the controller 2200 through one common channel. The controller 2200 is configured in a similar manner to the controller 2100 described with reference to FIG. 6, and is configured to control the plurality of memory chips of the semiconductor memory device 3100 through the plurality of channels CH1 to CHk.

Figure 9:
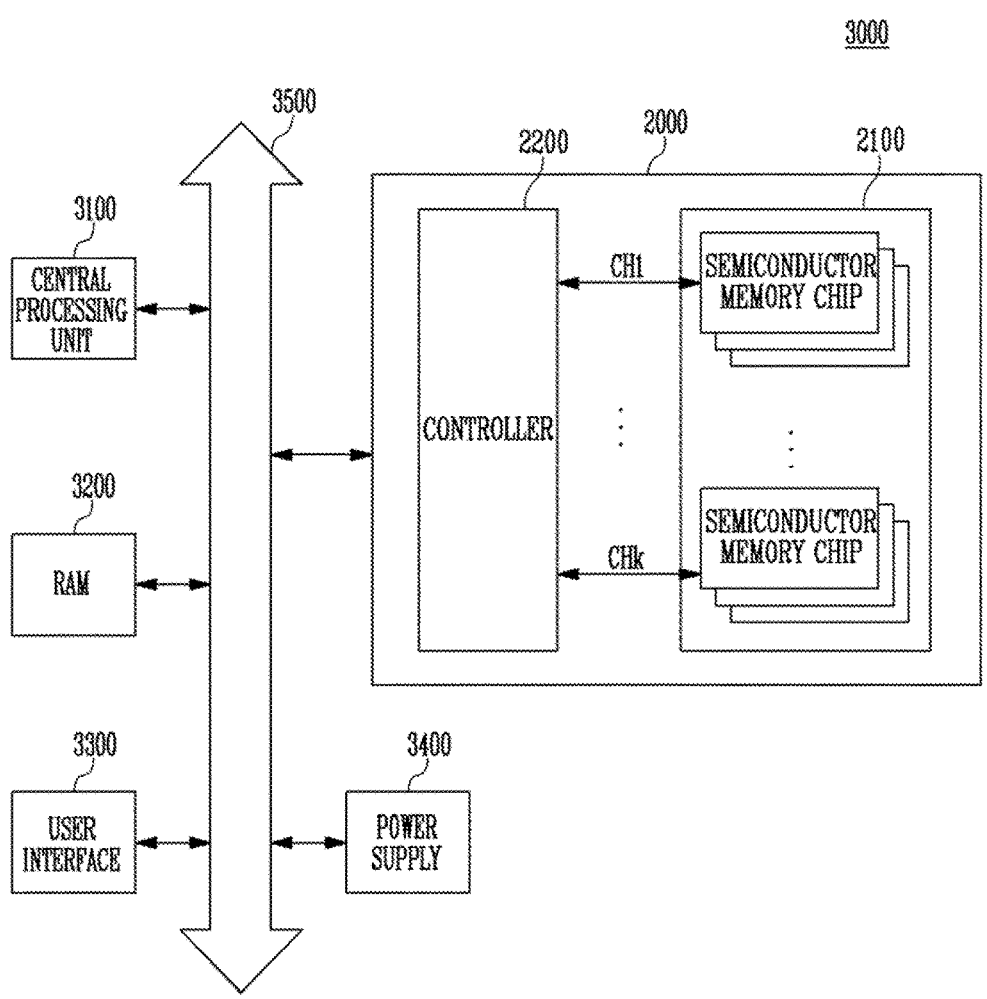
FIG. 9 is a block diagram illustrating a computing system including the memory system described with reference to FIG. 8.

FIG. 9 is a block diagram illustrating a computing system including the memory system described with reference to FIG. 8.

Referring to FIG. 9, a computing system 3000 includes a central processing unit 3100, a Random Access Memory (RAM) 3200, a user interface 3300, a power supply 3400, a system bus 3500, and the memory system 2000.

The memory system 2000 is electrically connected to the central processing unit 3100, the RAM 3200, the user interface 3300, and the power supply 3400 through a system bus 3500. Data provided through the user interface 3300 or processed by the central processing unit 3100 is stored in the memory system 2000.

In FIG. 9, it is illustrated that the semiconductor memory device 2100 is connected to the system bus 3500 through the controller 2200. However, the semiconductor memory device 2100 may be configured to be directly connected to the system bus 3500. In this case, the function of the controller 2200 may be performed by the central processing unit 3100 and the RAM 3200.

In FIG. 9, it is illustrated that the memory system 2000 described with reference to FIG. 8 is provided. However, the memory system 2000 may be substituted with the memory system 1000 described with reference to FIG. 7. In an embodiment, the computing system 3000 may be configured to include all of the memory systems 1000 and 2000 described with reference to FIGS. 7 and 8.

As described above, embodiments have been disclosed in the drawings and the specification. The specific terms used herein are for illustration, and do not limit the scope of the present disclosure defined in the claims. Accordingly, those skilled in the art will appreciate that various modifications may be made without departing from the scope and spirit of the present disclosure. Therefore, the scope of technical protection will be defined by the accompanying claims.

What is claimed is:

1. A semiconductor memory device, comprising:
    a memory unit including a plurality of memory blocks;
    a decoder suitable for storing bad block information about the plurality of memory blocks, and outputting the bad block information in response to an address signal; and
    a control logic suitable for controlling the memory unit and the decoder to update a status register (SR) code in response to the bad block information when the semiconductor memory device at a ready state enters a busy state, and to perform a general operation according to the updated SR code and a command,
    wherein the bad block information indicates whether a memory block of the plurality of memory blocks corresponding to a particular address is a bad memory block or not, and
    wherein the control logic includes:
        a command interface (CI) circuit suitable for generating the SR code according to the bad block information, and updating the SR code; and
        a micro circuit suitable for outputting a control signal for performing operations of the semiconductor memory device according to the updated SR code and the command.

2. The semiconductor memory device of claim 1, wherein the CI circuit initializes the SR code into a pass state when the semiconductor memory device at the ready state enters the busy state.

3. The semiconductor memory device of claim 1, wherein the CI circuit includes:
    a counter suitable for outputting an SR code update signal;
    an SR code generating unit suitable for generating the SR code according to the SR code update signal and the bad block information; and
    an SR code storing unit suitable for updating the SR code through the SR code generated by the SR code generating unit.

4. The semiconductor memory device of claim 3, wherein the counter outputs the SR code update signal, which is delayed by an amount of time from an activation of the decoder to an Input of the bad block information into the CI circuit.

5. The semiconductor memory device of claim 1, wherein the decoder includes:
    a pass section including a plurality of pass units respectively corresponding to the plurality of memory blocks, and suitable for connecting global word lines to word lines of the plurality of memory blocks in response to a plurality of block selection signals; and
    a block selection section suitable for outputting the plurality of block selection signals according to the address signal.

6. The semiconductor memory device of claim 5,
    wherein the block selection section includes a plurality of block selection units, and
    wherein each of the plurality of block selection units includes a latch storing the bad block information about a corresponding memory block.

7. The semiconductor memory device of claim 1, wherein the micro circuit includes:
    a read only memory (ROM) suitable for outputting an algorithm signal according to the updated SR code and the command; and
    a control signal generating unit suitable for outputting the control signal in response to the algorithm signal.

8. A semiconductor memory device, comprising:
    a memory unit including first and second planes, each of which includes a plurality of memory blocks;
    first and second decoders respectively corresponding to the first plane and the second plane, and suitable for outputting first and second bad block information about the first and second planes in response to an address signal; and
    a control logic suitable for controlling the memory unit and the first and second decoders to update a status register (SR) code in response to the bad block information, and to perform a general operation according to the updated SR code and a command,
    wherein the bad block information indicates whether a memory block of the plurality of memory blocks corresponding to a particular address is a bad memory block or not, and
    wherein the control logic includes:
        a command interface (CI) circuit suitable for generating the SR code according to the first and second bad block information, and updating the generated SR code; and
        a micro circuit suitable for outputting a control signal for performing operations of the semiconductor memory device according to the updated SR code and the command.

9. The semiconductor memory device of claim 8, wherein the memory unit includes first and second read and write circuits connected with bit lines of the first and second planes.

10. The semiconductor memory device of claim 9, wherein the micro circuit includes:
a read only memory (ROM) suitable for outputting an algorithm signal according to the updated SR code and the command; and
a control signal generating unit suitable for outputting the control signal in response to the algorithm signal.

11. The semiconductor memory device of claim 8, wherein the CI circuit initializes the SR code into a pass state when the semiconductor memory device at the ready state enters the busy state.

12. The semiconductor memory device of claim 8, wherein the CI circuit includes:
a counter suitable for outputting an SR code update signal;
an SR code generating unit suitable for generating the SR code according to the SR code update signal and the first and second bad block information; and
an SR code storing unit suitable for updating the SR code through the SR code generated by the SR code generating unit.

13. The semiconductor memory device of claim 12, wherein the counter outputs the SR code update signal, which is delayed by an amount of time from an activation of the first and second decoders to an input of the first and second bad block information into the CI circuit.

14. The semiconductor memory device of claim 8, wherein each of the first and second decoders includes:
a pass section including a plurality of pass units respectively corresponding to the plurality of memory blocks, and suitable for connecting global word lines to word lines of the plurality of memory blocks in response to a plurality of block selection signals; and
a block selection section suitable for outputting the plurality of block selection signals according to the address signal.

15. The semiconductor memory device of claim 14, wherein the block selection section includes a plurality of block selection units, and
wherein each of the plurality of block selection units includes a latch storing the bad block information about a corresponding memory block.

16. A method of operating a semiconductor memory device, comprising:
activating a decoder to output bad block information stored therein in response to a command;
generating and updating a status register (SR) code in response to the bad block information and an update signal; and
performing a general operation according to the updated SR code and the command,
wherein the bad block information indicates whether a memory block of the memory device corresponding to a particular address is a bad memory block or not
wherein the generating and updating of the status register (SR) code comprises:
generating the SR code according to the bad block information; and
updating the generated SR code, and
wherein the performing of the general operation comprises:
outputting a control signal for performing operations of the semiconductor memory device according to the updated SR code and the command.

17. The method of claim 16, wherein the update signal is delayed until the decoder is activated and outputs the bad block information.

18. The method of claim 16, further comprising initializing the SR code into a pass state in response to the command.

* * * * *